(12) United States Patent
Keupp et al.

(10) Patent No.: US 6,956,604 B1
(45) Date of Patent: Oct. 18, 2005

(54) APPARATUS AND METHOD FOR DETERMINING IMAGE CORRECTION VALUES FOR PRINTING AN IMAGE ACQUIRED WITH A DIGITAL CAMERA AND DEVICE FOR PRINTING AN IMAGE ON PRINTING MATERIAL

(75) Inventors: Wolfgang Keupp, München (DE); Günter Findeis, Sauerlach (DE); Manfred Fürsich, Taufkirchen (DE)

(73) Assignee: Agfaphoto GmbH, Leverkusen (DE)

( * ) Notice: Subject to any disclaimer, the term of this patent is extended or adjusted under 35 U.S.C. 154(b) by 0 days.

(21) Appl. No.: 09/509,316

(22) PCT Filed: Nov. 17, 1998

(86) PCT No.: PCT/EP98/07385

§ 371 (c)(1),
(2), (4) Date: Jun. 29, 2000

(87) PCT Pub. No.: WO99/27706

PCT Pub. Date: Jun. 3, 1999

(30) Foreign Application Priority Data

Nov. 20, 1997 (DE) .............................. 197 51 465

(51) Int. Cl.⁷ .......................................... H04N 5/225
(52) U.S. Cl. ................................................. 348/207.2
(58) Field of Search ..................... 348/207.2, 231.99, 348/207.1, 207.99; 358/1.9, 523; 347/2; 382/166, 274

(56) References Cited

U.S. PATENT DOCUMENTS

| | | | |
|---|---|---|---|
| 4,622,582 A | 11/1986 | Yamada | ........................ 358/80 |
| 5,040,068 A * | 8/1991 | Parulski et al. | ............. 348/376 |
| 5,361,140 A | 11/1994 | Hayenga et al. | ............. 358/446 |
| 5,493,332 A * | 2/1996 | Dalton et al. | ........... 348/207.99 |
| 5,613,004 A | 3/1997 | Cooperman et al. | ........... 380/28 |
| 5,617,223 A * | 4/1997 | Burns et al. | ................. 358/527 |
| 5,636,292 A | 6/1997 | Rhoads | ........................ 382/232 |
| 5,717,839 A | 2/1998 | Ichikawa | ..................... 395/109 |
| 6,282,362 B1 * | 8/2001 | Murphy et al. | ................ 386/46 |
| 6,396,539 B1 * | 5/2002 | Heller et al. | ................. 348/246 |

FOREIGN PATENT DOCUMENTS

| | | | |
|---|---|---|---|
| DE | 34 09 771 | 3/1984 | ........... H04N 1/46 |
| EP | 0 473 516 A2 | 8/1991 | ............ H04N 1/21 |
| JP | 3-41428 | 2/1991 | |
| WO | WO91/18470 | 11/1991 | |

OTHER PUBLICATIONS

08293023 May 11, 1996 Japanese Abstract.
"Developments in colour management systems," by Lindsay W. MacDonald, 1996 Elsevier Science B.V., Displays, vol. 16, No. 4, 1996, p. 203-211.
Olympus, "Für Motive, die nicht lange auf Belichtung warten".
Hinters Licht geführt, by Dr. Jürgen Rink, Report, Steganographie, vol. 6, 1997, p. 330-336.
"Steganography", http:/members.iquest.net/~mrmil/stego.html, Feb. 9, 1997.

* cited by examiner

*Primary Examiner*—Tuan Ho
(74) *Attorney, Agent, or Firm*—Darby & Darby

(57) ABSTRACT

A device (PR) and a method is proposed for determining image correction values for printing on printing material an image acquired with a digital camera. The type (KT1, ..., KTn) of the digital camera, which acquired the image to be printed, is identified. The image correction values for printing the image are determined as a function of the identified type (KT1, ..., KTn) of the digital camera.

4 Claims, 1 Drawing Sheet

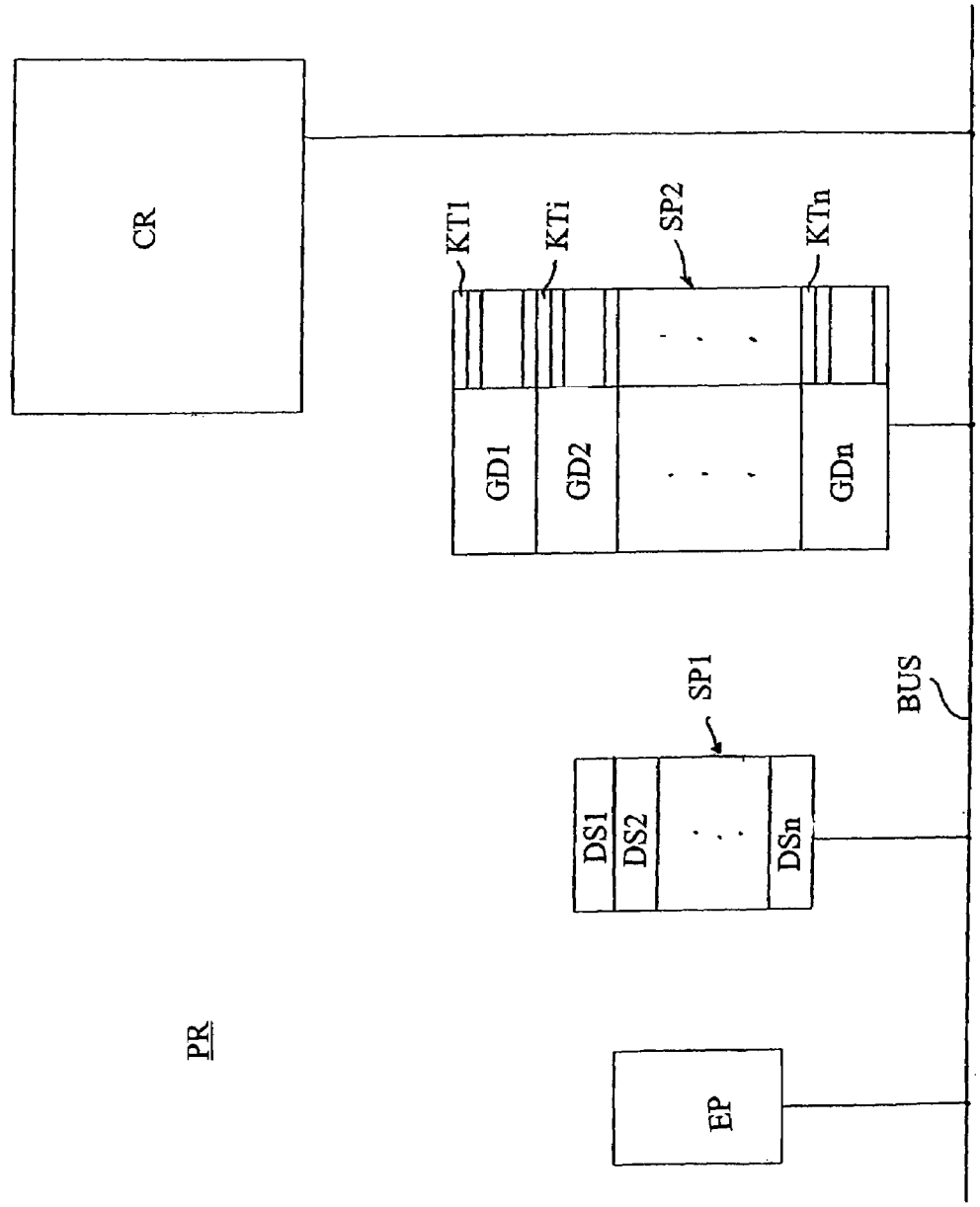

APPARATUS AND METHOD FOR DETERMINING IMAGE CORRECTION VALUES FOR PRINTING AN IMAGE ACQUIRED WITH A DIGITAL CAMERA AND DEVICE FOR PRINTING AN IMAGE ON PRINTING MATERIAL

BACKGROUND OF THE INVENTION

1. Field of the Invention

The present invention relates to an apparatus and a method for determining image correction values for printing an image acquired with a digital camera and device for printing an image on printing material.

2. Description of the Related Art

A large number of digital cameras of various designs and including different components are commercially available. More particularly, the different digital cameras include different image acquisition sensors which converts light into electrical signals. These image acquisition sensors have different characteristics, in particular different spectral sensitivity. For this reason, the color rendition and density representation of the images acquired by the different digital cameras is different.

The images acquired by the digital cameras are converted by the image acquisition sensors to digital image data which are stored in a memory device. Such a memory device can be, for example, a chip card. The image acquisition sensors in digital cameras are mostly in the form of so-called CCD (charge coupled devices) image sensors.

It is desirable to transfer the image data which are produced by the digital camera and represent the acquired images to a device capable of printing the acquired images. Such a printing device can be, for example, a so-called photo printer, a so-called mini lab or a printer controlled by a computer. The printing device produces from the acquired images prints on photographic paper, on printer paper or another printing material. The term "printing" is therefore to be understood as a general term for reproducing the acquired images on any type of printing material.

Due to the different characteristics of the components used in the various digital cameras, in particular the characteristics of the image acquisition sensors, unwanted color and density distortions can occur when the acquired images are printed on photographic paper or on other printing materials. A specific object captured by different digital cameras can therefore be reproduced differently on these prints.

It is therefore an object of the present invention to provide on printing materials an accurate and true reproduction of the images acquired with digital cameras.

SUMMARY OF THE INVENTION

According to the invention, the camera type, which is used to acquire an image to be printed, can be identified. The term "camera type" refers here to the physical components and the technical performance of the respective digital camera. The term "camera type", however, does not refer to the name or label under which the respective camera is sold commercially. It may be possible that a manufacturer of a digital camera changes the components or technical specification of the camera without also changing the commercial name or label. On the other hand, digital cameras having the same technical features and physical components may be available commercially under different labels.

The color and/or density response function of a specific type of digital camera with respect to the printed images can be taken in to account by determining the image correction values as a function of the specific digital camera type. The image correction values can be, for example, characteristic preset values for a color and/or density setting, for the gradation and/or image manipulation. For example, an exposure station used for final prints of the recorded images on the printing material, may use a color transformation table, a so-called 3-D lookup table.

Information about the type of the digital camera which acquired the image to be developed can be easily transmitted to be apparatus of the invention. This information is acquired by the apparatus of the invention. The apparatus of the invention can use this information to directly access a respective print data set. With the identification means implemented in this manner, the information specifying the type of the digital camera should be explicitly and clearly specified and preset.

The identification means can also be adapted to evaluate image data of at least one image to be printed. This evaluation can be limited to identifying the resolution or the color saturation of the acquired image or the type of formatting or compression of the data set. A complete evaluation of the image data which would be required to independently generate image correction values, is not required in this case. The type of the digital camera can thereby advantageously be identified quickly and unambiguously without knowing the camera specifications in advance.

According to another particularly advantageous embodiment of the invention, several print data sets which contain the image correction values for printing the images, are stored in a memory device. The print data sets are associated with predetermined types of digital cameras. The apparatus of the invention is capable of recognizing from the data transferred to the apparatus the type of the digital camera that acquired the image. The print data set for a specific camera can thereby be selected in response to the identified camera type.

According to yet another advantageous embodiment of the apparatus of the invention, the information containing the type of the digital camera is a hidden by a steganographic method in other captured data. The identification means can also use a steganographic method to identify the information containing the camera type. In this way, existing formats used for transmitting, storing and processing of image data can advantageously be retained.

The apparatus of the invention for determining image correction values can advantageously be directly integrated in a device which prints the image on the printing material. Alternatively, the apparatus can also be implemented separately from the actual printing device which prints the image on the printing material based on the data transmitted to the printing device. This may be the case, for example, when a computer running suitable application programs is used to determine the image correction values and a printer connected to this computer prints the image based on the data transmitted by the computer.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWING

The invention and its advantages will be described hereinafter with reference to a specific embodiment and the drawing.

The only FIGURE shows an embodiment of an apparatus according to the invention for determining image correction values for printing an image acquired with a digital camera.

DETAILED DESCRIPTION OF THE PRESENTLY PREFERRED EMBODIMENTS

The FIGURE shows the embodiment of an apparatus for printing images on printing material which in the present example is a so-called photo printer PR and includes an apparatus according to the invention for determining the image correction values for printing an image acquired with a digital camera. The FIGURE shows a portion of the printer PR, which includes a control device CR for controlling the functions which can be executed by the printer PR. A plurality of data sets DS1 to DSn is stored in a first memory device SP1. The data sets DS1 to DSn include image data generated by a digital camera during the image acquisition. Each of the data sets DS1 to DSn includes image data of a respective one of the acquired images. The printer includes a receiver EP which is capable of receiving data and/or signals of any kind. The receiver EP can read a memory device, for example chip cards.

The printer PR includes a second memory device SP2 which stores different print data sets GD1 to GDn. These print data sets GD1 to GDn include image correction values for printing the images to photographic paper. More particularly, the image correction values contain information about the color and/or density settings to be used for printing the images on the photographic paper. The print data sets GD1 to GDn are associated with different camera types KT1 to KTn. The term "camera type" here refers to the technical specifications and the physical components of the respective digital camera. In the exemplary embodiment, the print data set GD1 is associated, for example, with the camera type KT1, the print data set GD2 with the camera type KTi and the print data set GDn with the camera type KTn.

The image correction values contained in the different print data sets GD1 to GDn are specifically matched to the respective camera types. The image correction values include the known characteristics of the different camera types. These characteristics are determined—before the of the printer PR is operated—by a calibration process wherein several digital cameras of the same type are measured to determine the specific physical and electronic properties of this camera type. The characteristics of the camera type can, for example, produce color and/or density deviations in the acquired image, so that an image with a color cast or with saturated colors would be produced when printed on the particular printing material. The image correction values required for the respective camera type can be determined from the measured specific physical and electronic properties for this camera type and combined in a print data set. The print data sets GD1 to GDn advantageously have a fixed preset value which does not change during the operation of the apparatus of the invention.

The receiver EP can receive detailed information about the type of the digital camera used to acquire the image to be printed. Since the information about the camera type is unambiguous, it can be matched directly with the stored print data sets GD1 to GDn. The data set DS1 to DSn with the image data of the image to be printed can already include the information about the camera type. The information about the camera type can be determined by the control device CR, and the associated print data set stored in the second memory device SP2 can be selected. The exposure station subsequently uses the image correction values included in the selected print data set to produce the prints.

By applying a steganographic method, the information about the digital camera type is hidden in the other acquired image data which are included in the data sets DS1 to DSn, and can be identified by the control device CR also using a steganographic method. Steganographic methods are described, for example, in the article "Hinters Licht geführt" by J. Rink in the journal c't, 1997, vol. 6, pp. 330–336.

If such information about the camera type is not explicitly transmitted to the printer PR, then alternatively one of the data sets DS1 to DSn stored in the first memory device SP1 can be evaluated, so that the camera type used to acquire the respective picture can be identified from the image data stored in this data set. Each digital camera has certain characteristics with respect, for example, the resolution or the color saturation of the recorded images. In addition, each digital camera formats and compresses the generated image data in a particular manner. For determining the camera type, it is therefore sufficient to evaluate, for example, the format of the image data of the image to be printed. The actual contents of the image to be printed need not be evaluated. To determine the camera type more reliably, the format or other characteristic features of several data sets may be evaluated.

The device PR of the invention has a bus BUS for transmitting data within the device PR, with the components being connected to the device PR via bi-directional data transmission lines.

The control device CR subsequently uses the determined image correction values which are specific for the digital camera and combined in the selected print data set, to determine image-specific color print values for printing the respective image on the printing material. The individual color print values are then transmitted to an exposure station (not shown) which produces a print of the acquired image on photographic paper based on the color print values. The determination of the individual color print values for each image to be printed is not a part of the invention. The color print values can be determined, for example, by a method used for determining color print values for printing photographic masters on photographic paper, as described in the German patent DE-PS 28 40 287.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for correcting digital images produced by a digital camera, comprising the steps of:

identifying the camera type used to produce the digital images from image data provided by the camera;

correlating said camera type with correction values specific to the camera type to correct flaws common to images captured with said camera type; and adjusting all of the images produced by the camera according to said correction values.

2. The method according to claim 1, wherein information identifying the camera type is hidden in the image data provided by the camera using a steganographic method.

3. A device for determining correction values for digital images produced by a camera, comprising:

identification means responsive to digital image data produced by the camera for detecting the camera type that captured the digital image; and control means for determining camera type specific image correction values as a function of the identified camera type; and means responsive to said control means for correcting the digital images produced by the camera, whereby all of the images produced by the camera are corrected according to said correction values.

4. The device according to claim 3, wherein information identifying the camera type is hidden in the image data provided by the camera using a steganographic method.

* * * * *